United States Patent
Mu et al.

(10) Patent No.: US 11,753,731 B2
(45) Date of Patent: Sep. 12, 2023

(54) TWO-DIMENSIONAL METAL-ORGANIC FRAMEWORK ALLOY PHOTOCATALYSTS

(71) Applicants: Bin Mu, Tempe, AZ (US); Sefaattin Tongay, Tempe, AZ (US); Bohan Shan, Chandler, AZ (US); Yuxia Shen, Mesa, AZ (US); Joseph Winarta, Scottsdale, AZ (US)

(72) Inventors: Bin Mu, Tempe, AZ (US); Sefaattin Tongay, Tempe, AZ (US); Bohan Shan, Chandler, AZ (US); Yuxia Shen, Mesa, AZ (US); Joseph Winarta, Scottsdale, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 473 days.

(21) Appl. No.: 16/872,142

(22) Filed: May 11, 2020

(65) Prior Publication Data
US 2020/0354845 A1    Nov. 12, 2020

Related U.S. Application Data

(60) Provisional application No. 62/846,569, filed on May 10, 2019, provisional application No. 62/846,523, filed on May 10, 2019.

(51) Int. Cl.
| | |
|---|---|
| C25B 11/095 | (2021.01) |
| C07F 15/06 | (2006.01) |
| C25B 1/04 | (2021.01) |
| C25B 1/55 | (2021.01) |

(52) U.S. Cl.
CPC ............ *C25B 11/095* (2021.01); *C07F 15/06* (2013.01); *C25B 1/04* (2013.01); *C25B 1/55* (2021.01)

(58) Field of Classification Search
CPC ..................... C25B 11/091; C25B 11/095
See application file for complete search history.

(56) References Cited

U.S. PATENT DOCUMENTS

| | | |
|---|---|---|
| 9,716,239 B2 | 7/2017 | Mu et al. |
| 10,413,858 B2 | 9/2019 | Mu et al. |
| 2017/0145599 A1 | 5/2017 | Mu et al. |
| 2019/0217270 A1* | 7/2019 | Hinestroza ........... B01J 20/3021 |
| 2019/0276476 A1 | 9/2019 | Shan et al. |

FOREIGN PATENT DOCUMENTS

| | | | |
|---|---|---|---|
| CN | 105369306 A * | 3/2016 | ........... C25B 11/095 |
| CN | 109400906 A * | 3/2019 | ........... C08G 83/008 |

OTHER PUBLICATIONS

Khajavian et al. Cu-based metal-organic framework thin films: A morphological and photovoltaic study. Journal of Solid State Chemistry 262. 2018. 94-99. (Year: 2018).*
Zhao et al, Two-dimensional metal-organic framework nanosheets: synthesis and applications, Chemical Society Reviews, vol. 47, No. 16, Apr. 2018, pp. 6267-6295 (Year: 2018).*
Cao et al, Synthesis of Two-Dimensional CoS1.097/Nitrogen-Doped Carbon Nanocomposites Using Metal-Organic Framework Nanosheets as Precursors for Supercapacitor Application, Journal of the American Chemical Society, vol. 138, No. 22, May 2016, pp. 6924-6927 (Year: 2016).*
Shen et al, Ultimate Control over Hydrogen Bond Formation and Reaction Rates for Scalable Synthesis of Highly Crystalline vdW MOF Nanosheets with Large Aspect Ratio, Advanced Materials, vol. 30, No. 52, Nov. 2018, pp. 1802497 (1-8) (Year: 2018).*
Sakaida et al, Crystalline coordination framework endowed with dynamic gate-opening behaviour by being downsized to a thin film, Nature Chemistry, vol. 8, No. 4, Mar. 2016, pp. 377-383 (Year: 2016).*

* cited by examiner

*Primary Examiner* — Harry D Wilkins, III
(74) *Attorney, Agent, or Firm* — Fish & Richardson P.C.

(57) ABSTRACT

A two-dimensional metal-organic framework (2D MOF) includes a first transition metal $M^1$ and a second transition metal $M^2$. The first transition metal and the second transition metal are different and are coupled by a linker group L to yield a two-dimensional metal-organic framework alloy having a formula $M^1_x M^2_{1-x} L$, where $0<x<1$. Each transition metal is dispersed uniformly throughout the 2D MOF. The 2D MOF is synthesized by combining a first transition metal precursor, a second transition metal precursor, and a linker; agitating the solution; and heating the solution to yield a crystalline two-dimensional metal-organic framework alloy.

10 Claims, No Drawings

TWO-DIMENSIONAL METAL-ORGANIC FRAMEWORK ALLOY PHOTOCATALYSTS

CROSS-REFERENCE TO RELATED APPLICATION

This application claims the benefit of U.S. Patent Application No. 62/846,569 entitled "TWO-DIMENSIONAL METAL-ORGANIC FRAMEWORK ALLOY PHOTOCATALYSTS" and U.S. Patent Application No. 62/846,523 entitled "TWO-DIMENSIONAL METAL-ORGANIC FRAMEWORK ALLOYS," both filed on May 10, 2019, and both incorporated by reference herein in their entirety.

TECHNICAL FIELD

This invention relates to design and synthesis as well as optical and electronic performance of photocatalytic two-dimensional metal-organic framework alloys.

BACKGROUND

Metal-organic-framework (MOFs) are materials constructed by joining inorganic metal-containing units with organic linkers, bonded strongly to create open crystalline frameworks with enduring porosity. Sensitivity and reactivity of the reaction materials can make it difficult to synthesize MOFs with specific properties, due at least in part to the different coordination that the metal precursors can assume. In particular, there have been challenges associated with synthesizing two-dimensional (2D) MOF alloys in the absence of phase-separated mixtures.

SUMMARY

Design and synthesis as well as optical and electronic performance of photocatalytic two-dimensional (2D) metal-organic framework (MOF) alloys is described.

In a first general aspect, a two-dimensional metal-organic framework (2D MOF) includes a first transition metal $M^1$ and a second transition metal $M^2$. The first transition metal and the second transition metal are different and are coupled by a linker group L to yield a two-dimensional metal-organic framework alloy having a formula $M^1_x M^2_{1-x} L$, where $0<x<1$.

Implementations of the first general aspect may include one or more of the following features.

$M^1$ and $M^2$ are independently selected from Mn, Fe, Co, Ni, Cu, and Zn. L is a dicarboxylic acid, such as benzene-1,4-dicarboxylic acid (BDC). In one example, $M^1$ is Co and $M^2$ is Ni. The 2D MOF may further include a capping agent. In some cases, the two-dimensional metal-organic framework comprises two or more layers separated by the capping agent. One example of a suitable capping agent is pyridine. The 2D MOF alloy is crystalline. The first transition metal and the second transition metal are each dispersed uniformly throughout the two-dimensional metal-organic framework In a second general aspect, synthesizing a two-dimensional metal-organic framework includes combining a first transition metal precursor, a second transition metal precursor, and a linker; agitating the solution; and heating the solution to yield a crystalline two-dimensional metal-organic framework alloy.

Implementations of the second general aspect may include one or more of the following features.

The first transition metal precursor, the second transition metal precursor, or both typically include acetylacetonate, chloride, or nitrate. One example of a suitable linker is benzene-1,4-dicarboxylic acid. In some cases, the solution includes a capping agent, such as pyridine.

In a third general aspect, a photocatalyst includes a crystalline two-dimensional metal-organic framework alloy, where the alloy has a first transition metal and a second transition metal, each transition metal dispersed uniformly throughout the two-dimensional metal-organic framework.

Implementations of the third general aspect may include one or more of the following features.

The two-dimensional metal-organic framework alloy typically catalyzes water splitting. The photocatalyst may include $Co_x Ni_{1-x} DBC$, where $0<x<1$ and BDC represents benzene-1,4-dicarboxylic acid. The quantum efficiency of $Co_x Ni_{1-x} BDC$ exceeds that of CoBDC, NiBDC, and $TiO_2$. The photocatalyst of the third general aspect may be in the form of a film disposed on the substrate.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

This disclosure describes design and synthesis as well as optical and electronic performance of photocatalytic two-dimensional (2D) metal-organic framework (MOF) alloys with van der Waals (vdW) bonding between layers. Synthesis of a photocatalytic 2D MOF alloy includes preparing a metal precursor solution and preparing a ligand solution. The metal precursor solution typically includes two or more different transition metal precursors and a solvent. For two different transition metal precursors, a mole ratio of a first metal precursor to a second metal precursor is typically in a range of 0.01:0.99 to 0.99:0.01. In some cases, the metal precursor solution includes a capping agent. Suitable metal precursors include nitrate, chloride, and acetylacetonate (acac) salts of transition metals such as Mn, Fe, Co, Ni, Cu, and Zn (e.g., $Zn(NO_3)_2 \cdot 6H_2O$, $Cu(NO_3)_2 \cdot 3H_2O$, $NiCl_2 \cdot 6H_2O$, $Ni(acac)_2$, $CoCl_2 \cdot 6H_2O$, $MnCl_2 \cdot 4H_2O$, and $FeCl_3$). The metal precursor solution typically has a total metal concentration in a range of 1 mmol to 1.5 mmol. Examples of suitable organic solvents include organic solvents such as dimethylformamide (DMF), chloroform, dichloromethane, methanol, ethanol, hexane, and acetone. In some cases, a capping agent is combined with the metal precursor solution. A mole ratio of the capping agent to the metal precursor (total) is typically in a range of 0.001 to 1000. One example of a suitable capping agent is pyridine. A ligand solution includes a ligand precursor and a solvent. Suitable ligands include dicarboxylic acids, such as benzene-1,4-dicarboxylic acid (BDC) and derivatives of BDC, including $NH_2$-BDC and Cl-BDC, and extended versions of BDC, including biphenyl-4,4'-dicarboxylic acid. Examples of suitable solvents include organic solvents such as dimethylformamide (DMF), chloroform, dichloromethane, methanol, ethanol, hexane, and acetone. The ligand solution typically has a ligand concentration in a range of 0.001-100 mol/L.

The metal precursor solution and the ligand solutions are agitated (e.g., sonicated) and then combined. In one example, the metal precursor solution is added to the ligand solution by dropwise addition to yield a reaction mixture. The reaction mixture is heated to yield a crystalline photocatalytic 2D MOF alloy of the formula $M^1_x M^2_{1-x} BDC$, where $0<x<1$. The crystals can be cleaned by washing and collected. The collected 2D MOF alloy crystals can be dried.

In one example, $CoCl_2 \cdot 6H_2O$ and $NiCl_2 \cdot 6H_2O$ of a selected molar ratio were combined in amounts to yield a metal precursor mixture with 1.33 mmol combined metal precursor. The metal precursor mixture and 0.18 mL pyridine were combined with 10 mL DMF to yield a metal precursor solution. 2 mmol $H_2BDC$ and 5 mL DMF were combined to yield the ligand solution. The metal precursor solution and the ligand solution were each sonicated for 2 minutes. The metal precursor solution was added dropwise to the ligand solution to yield a reaction mixture. The reaction mixture was sealed in an autoclave with a TEFLON liner and heated at 120° C. for 16 hours to yield 2D MOF alloy crystals. The crystals were cleaned by exchanging the remaining solvent with fresh DMF and acetone three times. The collected crystals were dried in a vacuum oven at 100° C. for 10 hours. Other MOF alloys were synthesized by this same procedure with different metal precursors.

Although a reaction including a metal precursor solution including Co and Ni and a ligand solution including BDC is described, other metals, metal precursors, and linkers may be combined and reacted to yield 2D MOF alloys. Examples of 2D MOF alloys obtained by this synthetic procedure include $Co_xNi_{1-x}BDC$, $Co_xZn_{1-x}BDC$, $Ni_xZn_{1-x}BDC$, $Fe_xZn_{1-x}BDC$, $Mn_xCo_{1-x}BDC$, $Mn_xZn_{1-x}BDC$, $Cu_xZn_{1-x}BDC$, and $Co_xCu_{1-x}BDC$. Specific examples include $Co_{0.22}Ni_{0.78}BDC$, $Co_{0.34}Ni_{0.66}BDC$, $Co_{0.52}Ni_{0.48}BDC$, $Co_{0.68}Ni_{0.32}BDC$, $Co_{0.78}Ni_{0.22}BDC$, $Co_{0.50}Cu_{0.50}BDC$. $Cu_{0.89}Zn_{0.11}BDC$, $Ni_{0.92}Zn_{0.08}BDC$ These 2D MOF alloys can be exfoliated into monolayer or multilayer (e.g., fewer than 10 layers) structures without compromising lateral dimension. The exfoliated 2D MOF alloy can be deposited onto a substrate or another 2D material to yield a heterostructure. 2D MOF alloys exhibit a crystal structure similar to that of 2D MOFs with a single metal. In one example, Fourier transform infrared (FTIR) spectra and X-ray diffraction (XRD) spectra of $Co_{0.52}Ni_{0.48}BDC$ are similar to those obtained from CoBDC and NiBDC.

The crystallinity of a 2D MOF having the formula $M^1_xM^2_{1-x}BDC$ can be increased by increasing a fraction of $M^1$ or $M^2$. In one example, the crystallinity of $Co_xNi_{1-x}BDC$ increased as x (the fraction of Co) increased sequentially from 0.34 to 0.52 to 0.68 to 0.78. The crystallinity, or degree of structural order of the 2D MOF, can be evaluated using X-ray crystallography. A higher crystallinity corresponds to a 2D MOF with fewer defects.

Different metal cations have different reaction capability with carboxylate ligands such as DBC. This difference can affect the resulting MOF structure. In one example, for a Co/Ni alloy, Co has a weaker reaction capability with carboxylate ligands than Ni. When starting with a Co/Ni molar ratio of 0.5/0.5 molar ratio in the metal precursor solution, the resulting 2D MOF included a Co fraction of 0.2 ($Co_{0.2}Ni_{0.8}BDC$). To demonstrate the competition disparity between $M^1$ and $M^2$, an "odds ratio" as $$OR = \frac{\frac{M^1}{M^2}(\text{Alloy})}{\frac{M^1}{M^2}(\text{Precursor})}$$

can be defined. This ratio can be plotted, with the numerator on the y axis, the denominator on the x axis, and the log odds ratio in the form of contour lines. A diagonal line is an ideal situation in which $M^1$ and $M^2$ have substantially equal reaction capability with carboxylate. When the log odds ratio is less than 0, $M^2$ takes precedence over $M^1$, as demonstrated in the case of $M^1/M^2=Co/Ni$. This competitive growth was also found to be applicable to Zn/Ni, Zn/Co, and Cu/Co alloys.

Different metal precursors resulted in differing degrees of uniformity of metal dispersion in the 2D MOF alloys. In one example, it was demonstrated that metal chloride precursors resulted in nonuniform metal dispersion characterized by phase separation. In another example, it was found that utilizing strong metal (e.g., a metal with a higher electronegativity, such as Ni) with a large pKa value salt (e.g., weaker acids, indicating slower binding to the metal precursor) resulted in uniform metal dispersion in the resulting 2D MOF alloy. Uniformity of the metal dispersion is typically assessed by scanning electron microscopy-energy dispersive X-ray spectroscopy (SEM-EDS).

For 2D MOFs synthesized in the presence of a suitable capping agent, such as pyridine, the resulting crystals are stacked predominantly along (001), which yields a greater crystallinity, allowing vdW interaction and the desired exfoliation. Without a suitable capping agent, the resulting crystals are stacked predominantly along (100) direction, and have less crystallinity and are not as readily exfoliated. Thus, the presence of a suitable capping agent was found to allow synthesis of the resulting crystals in a selected orientation.

2D MOFs can be exfoliated on desired substrates. The work function of the exfoliated layers is a function of thickness of the exfoliated layers. Along with an increase in thickness, work functions of a 2D MOF has different decline speeds. Moreover, changing the metal ratio in a 2D MOF alloy results in a tuning of optical properties of the 2D MOF. In one example, the optical bandgap value was found to be a function of the fraction of Co in $Co_xNi_{1-x}BDC$ MOF alloys. Generally, the optical band gaps change along with the combined metal pairs. Among these types of alloys, $Mn_{0.89}Zn_{0.11}$ has a smaller band gap value of 3.42 eV, while $Ni_{0.47}Zn_{0.53}$ has a larger band gap value of 4.01 eV. Combinations of Zn with different metals, i.e., Co and Cu, leads to a band gap variation of 80 meV, although the fraction of Zn is comparable in $Co_{0.62}Zn_{0.38}$ and $Cu_{0.68}Zn_{0.32}$.

Photocatalytic performance is assessed as incident photon to current efficiency (IPCE), or $$IPCE = \frac{\text{\# of Electrons }(n)}{\text{\# of Photons }(N)}.$$

In one example, the working electrode is a catalyst film on conductive ITO glass, the counter electrode is Pt wire, the reference electrode is Ag/AgCl, the electrolyte is ultrapure deionized water, the current is 2000 mA, the scan range is 320 nm-700 nm, and the scan step is 2 mm. Incident photon-to-electron conversion efficiencies were assessed for CoBDC, NiBDC, and a $Co_xNi_{1-x}BDC$ alloy. The maximum value of IPCE in the CoNi alloy is 9.3% with an incident light wavelength of 360 nm. The IPCE value remains higher than 5% within the incident wavelength of 450 nm. CoBDC exhibits a lower value, and NiBDC exhibits an even lower value than the alloy. The photo-generated current density was detected during the first discharge. The maximum value of the alloy was almost double that of CoBDC. Thus, the bimetallic alloy is favorable for its catalytic application.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A two-dimensional metal-organic framework comprising:
    a first transition metal;
    a second transition metal;
    a linker group; and
    a capping agent,
    wherein the first transition metal is Co, the second transition metal is Ni, the linker group is benzene-1,4-dicarboxylic acid, and the capping agent is pyridine, wherein the first transition metal and the second transition metal are coupled by the linker group, and
    the two-dimensional metal-organic framework comprises two or more layers separated by the capping agent.

2. The two-dimensional metal-organic framework of claim 1, wherein the two-dimensional metal-organic framework alloy is crystalline.

3. The two-dimensional metal-organic framework of claim 1, wherein the first transition metal and the second transition metal are each dispersed uniformly throughout the two-dimensional metal-organic framework.

4. A method of synthesizing the two-dimensional metal-organic framework of claim 1, the method comprising:
    combining a first transition metal precursor comprising the first transition metal, a second transition metal precursor comprising the second transition metal, the linker, and the capping agent to yield a solution;
    agitating the solution; and
    heating the solution to yield the two-dimensional metal-organic framework alloy.

5. The method of claim 4, wherein the first transition metal precursor comprises acetylacetonate, chloride, or nitrate.

6. The method of claim 4, wherein the second transition metal precursor comprises acetylacetonate, chloride, or nitrate.

7. A photocatalyst comprising:
    the two-dimensional metal-organic framework alloy of claim 1, wherein the Co and Ni are dispersed uniformly throughout the two-dimensional metal-organic framework.

8. The photocatalyst of claim 7, wherein the two-dimensional metal-organic framework alloy catalyzes water splitting.

9. The photocatalyst of claim 7, wherein the quantum efficiency of $Co_xNi_{1-x}BDC$ exceeds that of CoBDC, NiBDC, and $TiO_2$.

10. The photocatalyst of claim 7, further comprising a substrate, wherein the photocatalyst comprises a film disposed on the substrate.

* * * * *